United States Patent
Murakami et al.

(10) Patent No.: US 9,670,825 B2
(45) Date of Patent: Jun. 6, 2017

(54) FLOW RATE-CONTROLLING VALVE

(71) Applicant: HITACHI AUTOMOTIVE SYSTEMS, LTD., Hitachinaka-shi, Ibaraki (JP)

(72) Inventors: Shingo Murakami, Atsugi (JP); Junichiro Onigata, Atsugi (JP); Kishiro Nagai, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/772,988

(22) PCT Filed: Feb. 3, 2014

(86) PCT No.: PCT/JP2014/052397
§ 371 (c)(1),
(2) Date: Sep. 4, 2015

(87) PCT Pub. No.: WO2014/148126
PCT Pub. Date: Sep. 25, 2014

(65) Prior Publication Data
US 2016/0010536 A1   Jan. 14, 2016

(30) Foreign Application Priority Data
Mar. 21, 2013   (JP) ................... 2013-058880

(51) Int. Cl.
*F01P 7/14* (2006.01)
*F16K 11/076* (2006.01)
*F16K 11/085* (2006.01)
*F16K 11/087* (2006.01)
*F01P 3/20* (2006.01)
*F16K 31/04* (2006.01)

(52) U.S. Cl.
CPC    *F01P 7/14* (2013.01); *F01P 3/20* (2013.01); *F16K 11/076* (2013.01);
(Continued)

(58) Field of Classification Search
CPC .. F16K 11/076; F16K 11/085; F16K 11/0856; F16K 11/0876; F16K 31/041;
(Continued)

(56) References Cited

U.S. PATENT DOCUMENTS 2,297,161 A * 9/1942 Newton ................ F16K 5/0668
251/315.08
4,355,659 A * 10/1982 Kelchner ............ F16K 11/0856
137/597

(Continued)

FOREIGN PATENT DOCUMENTS

JP    S53-067132 U    6/1978
JP    57-028959 U    2/1982

(Continued)

*Primary Examiner* — Mary McManmon
*Assistant Examiner* — Richard K Durden
(74) *Attorney, Agent, or Firm* — Foley & Lardner LLP

(57) ABSTRACT

In a cylindrical valve body 3, a first opening portion M1 for a heater heat exchanger and a second opening portion M2 for an oil cooler are arranged parallel in an axial direction of the valve body 3. A third opening portion M3 for a radiator is arranged in a different circumferential direction position from the first or second opening portion M1 or M2 on an outer peripheral surface of the valve body 3 so that at least a part of the third opening portion M3 overlaps with the first or second opening portion M1 or M2 in the axial direction.

20 Claims, 10 Drawing Sheets

(52) U.S. Cl.
CPC ........ *F16K 11/085* (2013.01); *F16K 11/0876* (2013.01); *F16K 31/04* (2013.01); *F01P 2007/146* (2013.01)

(58) Field of Classification Search
CPC .. F01P 7/14; F01P 2007/143; F01P 2007/146; Y10T 137/86533; Y10T 137/86541; Y10T 137/86549; Y10T 137/86823; Y10T 137/86832; Y10T 137/86847; Y10T 137/86863; Y10T 137/86871
USPC ............ 137/625.15, 625.16, 625.17, 625.41, 137/625.42, 625.44, 625.46, 625.47
See application file for complete search history.

(56) References Cited

U.S. PATENT DOCUMENTS

| | | | | |
|---|---|---|---|---|
| 5,288,290 A | * | 2/1994 | Brody | ................ A61M 39/223 137/625.47 |
| 2003/0098077 A1 | | 5/2003 | McLane et al. | |
| 2004/0108006 A1 | * | 6/2004 | McLane | ............. B60H 1/00485 137/625.47 |
| 2006/0201455 A1 | * | 9/2006 | Chanfreau | ......... B60H 1/00485 123/41.1 |
| 2007/0044856 A1 | * | 3/2007 | Bonior | ................ F16K 11/0856 137/625.47 |
| 2010/0282190 A1 | | 11/2010 | Stoermer | |

FOREIGN PATENT DOCUMENTS

| | | |
|---|---|---|
| JP | 59-056467 U | 4/1984 |
| JP | 2003-336753 A | 11/2003 |
| JP | 2005-510668 A | 4/2005 |
| JP | 2007-100894 A | 4/2007 |
| JP | 2008-504504 A | 2/2008 |
| JP | 2010-043555 A | 2/2010 |
| JP | 2010-507762 A | 3/2010 |

* cited by examiner

FLOW RATE-CONTROLLING VALVE

TECHNICAL FIELD

The present invention relates to a flow rate-controlling valve used for, for example, flow rate control of cooling water of a vehicle.

BACKGROUND OF THE INVENTION

For example, as a related art flow rate-controlling valve applied to the flow rate control of the cooling water of the vehicle, for example, a flow rate-controlling valve disclosed in following Patent Document 1 has been known.

That is, this flow rate-controlling valve has a cylindrical housing in which a first discharge port that is connected to a radiator, a second discharge port that is connected to a heat exchanger for a heater and a third discharge port that is connected to an oil cooler are arranged parallel along an axial direction, and a cylindrical valve body that is rotatably supported in the housing and has first to third opening portions whose overlap states with the respective discharge ports are changed according to a rotation position (phase) of the valve body. This flow rate-controlling valve controls a distribution destination and the flow rate of cooling water by the fact that the rotation position of the valve body is controlled according to a vehicle operating condition by an electric motor.

PRIOR ART REFERENCE

Patent Document

Patent Document 1: Japanese translation of PCT international application publication 2010-507762

SUMMARY OF THE INVENTION

Task to be Solved by the Invention

However, since the discharge ports are arranged parallel in the axial direction in the related art flow rate-controlling valve, there is a problem of increasing an overall size of the valve.

The present invention was made in consideration of such a technical problem. An object of the present invention is to provide a flow rate-controlling valve which is capable of reducing the overall size of the valve.

Means for Solving the Task

A flow rate-controlling valve of the present invention comprises: a housing having a main communication port for introduction or discharge of cooling water, which is provided at a substantially cylindrical valve body accommodating portion, and first to third communication ports which communicate with the valve body accommodating portion from a radial direction to introduce or discharge the cooling water into or from the valve body accommodating portion; a substantially cylindrical valve body rotatably supported in the housing, the valve body having first to third opening portions whose overlap states with the respective first to third communication ports are changed according to a rotation position of the valve body; and an actuator controlling the rotation position of the valve body. And the first and second opening portions are arranged parallel in an axial direction on an outer peripheral surface of the valve body, and the third opening portion is arranged in a different circumferential direction position from the first or second opening portion on the outer peripheral surface of the valve body so that at least a part of the third opening portion overlaps with the first or second opening portion in the axial direction.

The cooling water of the vehicle is an example that is applied to the present invention, and the present invention is not limited to this. The present invention can be applied to any fluid.

Effects of the Invention

According to the present invention, first and second communication ports (first and second opening portions) and a third communication port (a third opening portion) are arranged so as to overlap with each other in an axial direction. It is, therefore, possible to reduce a size in the axial direction of a valve.

BRIEF DESCRIPTION OF THE DRAWINGS

FIG. 8(a) shows a state in which only a second discharge port is in a communication state. FIG. 8(b) shows a state in which all discharge ports are in a non-communication state. FIG. 8(c) shows a state in which only a first discharge port is in the communication state. FIG. 8(d) shows a state in which the first and second discharge ports are in the communication state. FIG. 8(e) shows a state in which all of the discharge ports are in the communication state.

DETAILED DESCRIPTION OF THE INVENTION

In the following, embodiments of a flow rate-controlling valve according to the present invention is explained based on the drawings. In each embodiment, the flow rate-controlling valve of the present invention is explained with the flow rate-controlling valve that is applied to a conventional circular system of cooling water for a vehicle (hereinafter, simply called "cooling water") taken for example.

[First Embodiment]

Figure 1:
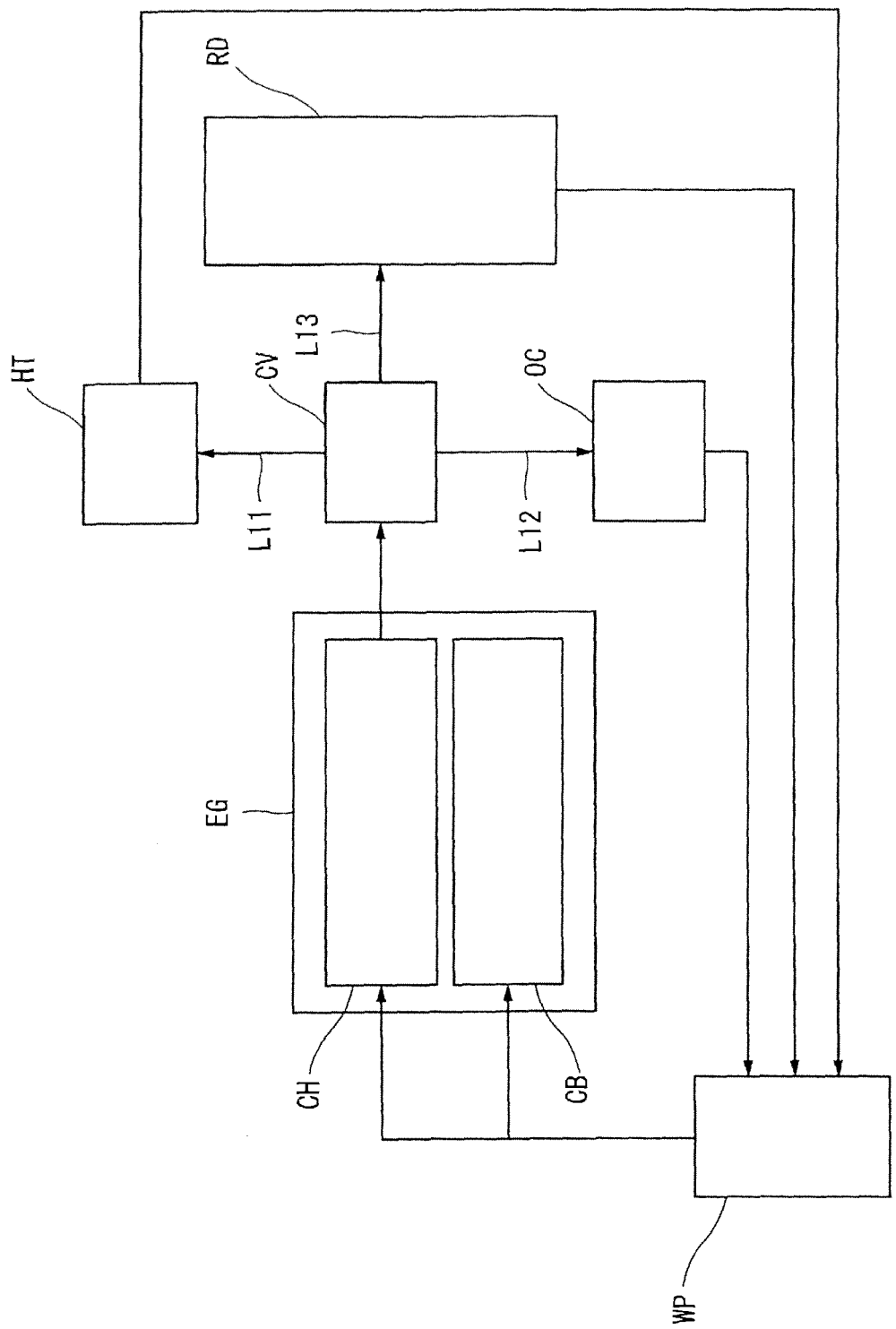
FIG. 1 is a schematic system diagram of a circulation system of cooling water for a vehicle, showing a first embodiment of a flow rate-controlling valve according to the present invention.
Figure 2:
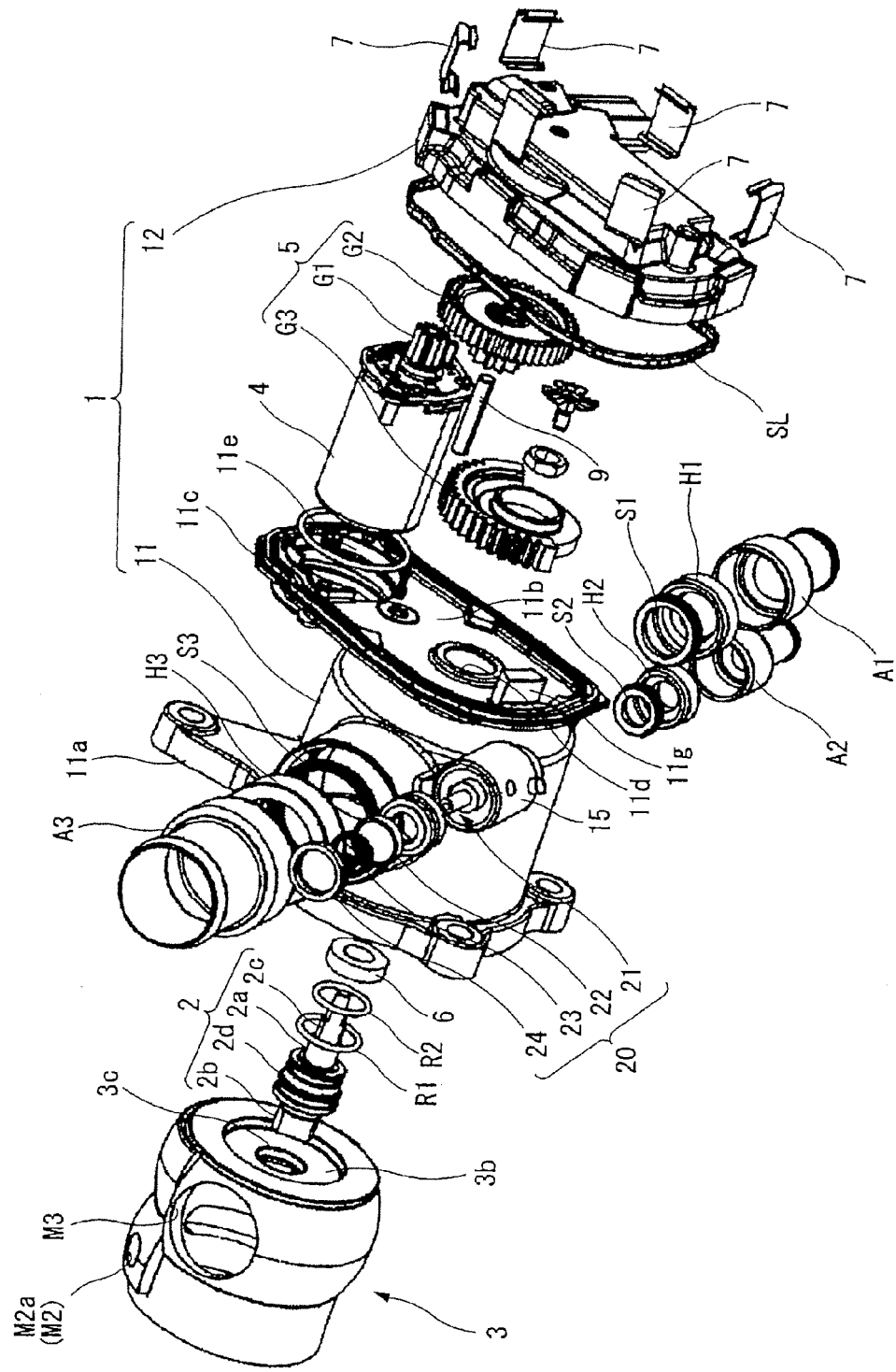
FIG. 2 is a perspective exploded view of the flow rate-controlling valve according to the present invention.
Figure 3:
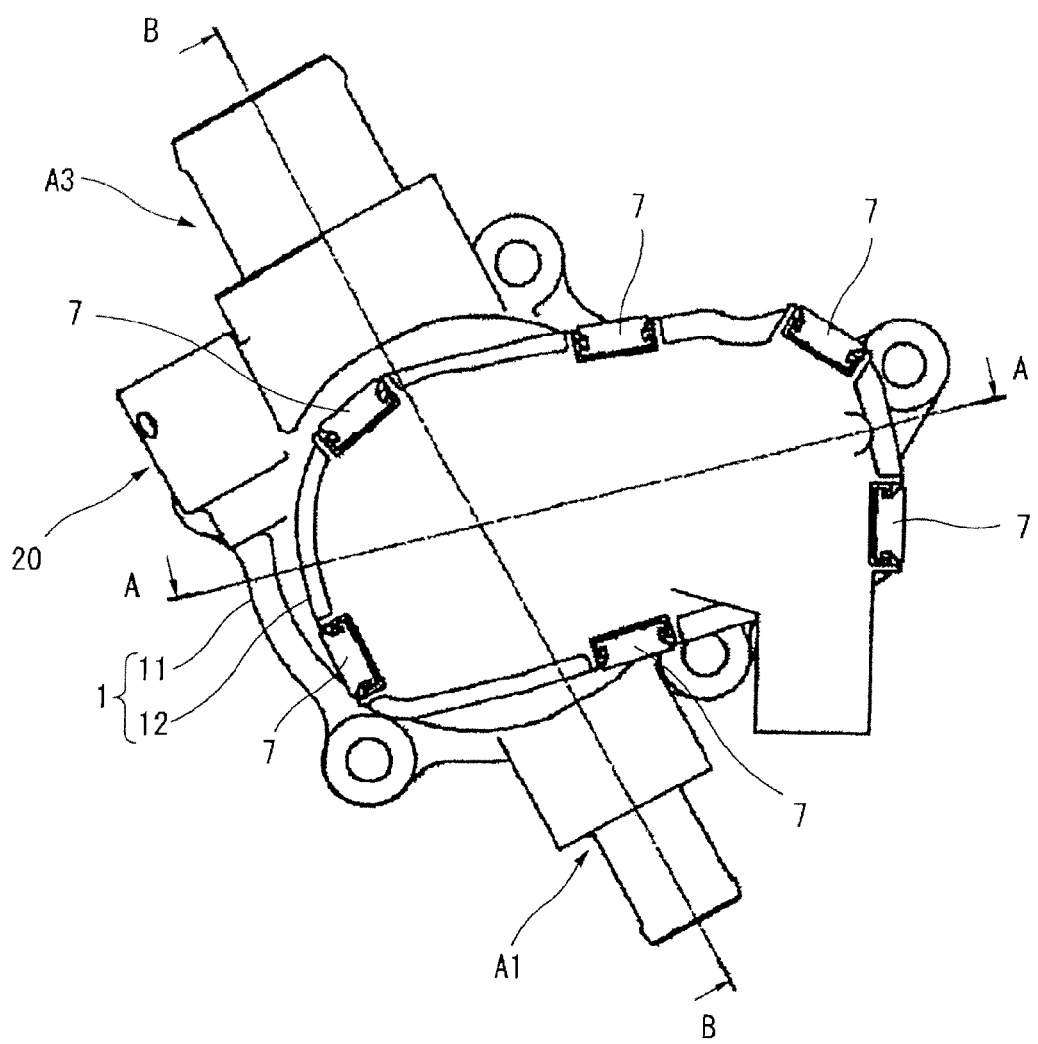
FIG. 3 is a front view of the flow rate-controlling valve shown in FIG. 2.
Figure 4:
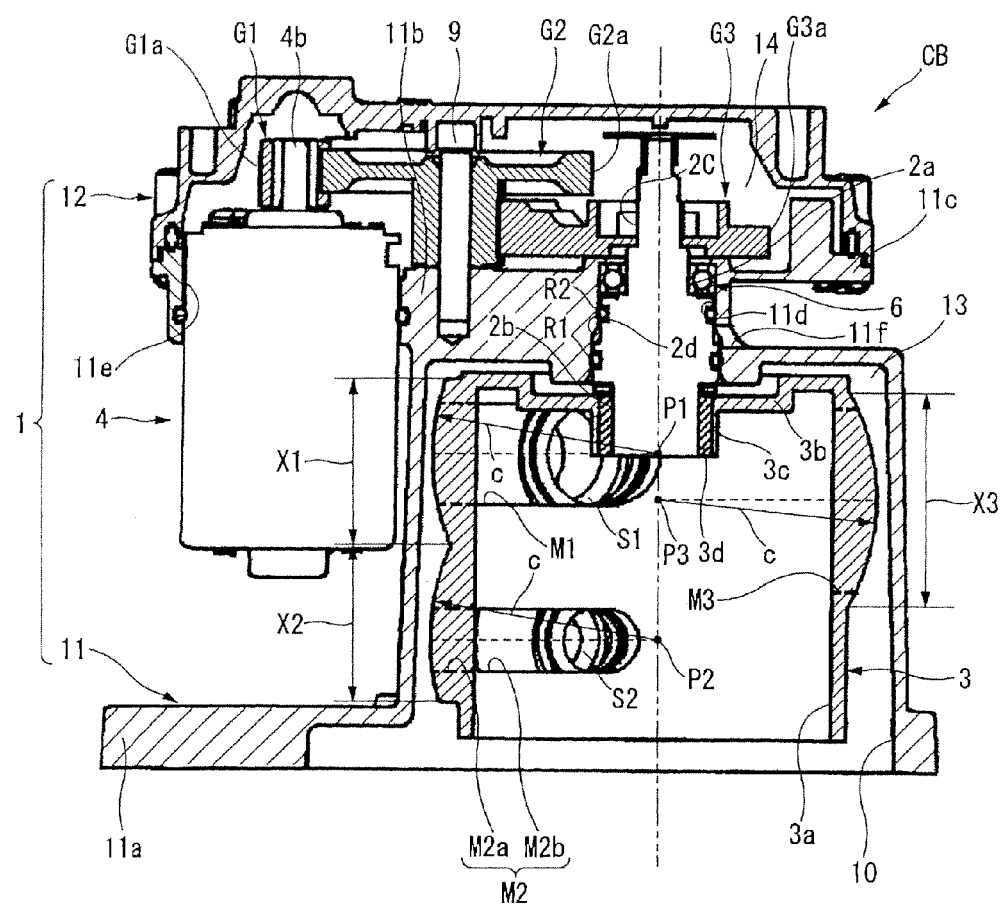
FIG. 4 is a sectional view taken along a line A-A of FIG. 3.
Figure 5:
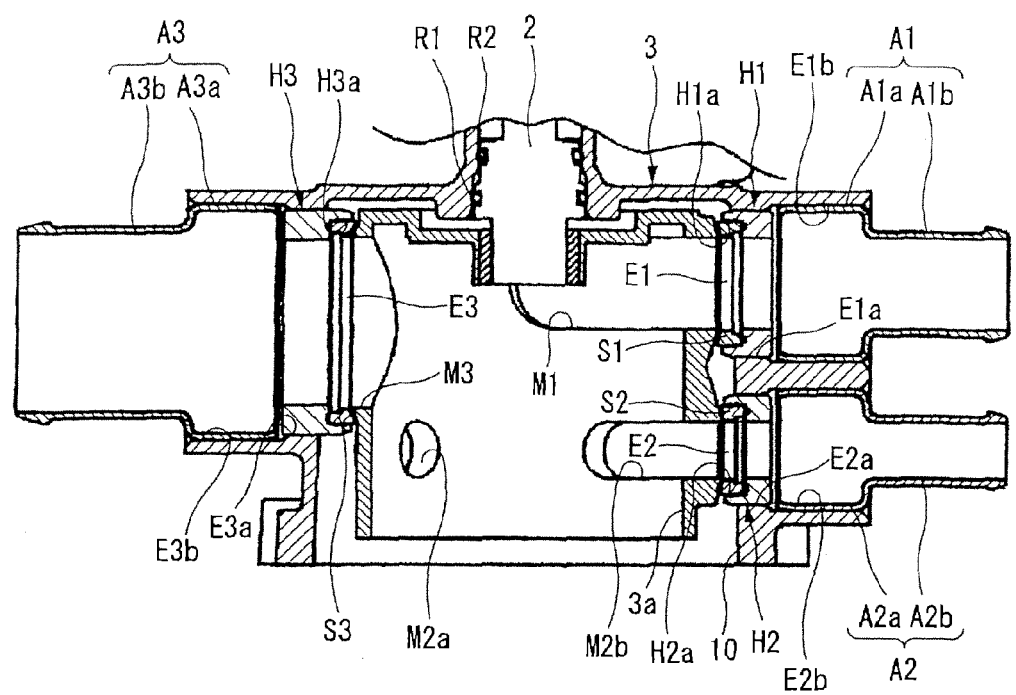
FIG. 5 is a sectional view taken along a line B-B of FIG. 3.

FIG. 1 to FIG. 8 show a first embodiment of the flow rate-controlling valve according to the present invention. As shown in FIG. 1, this flow rate-controlling valve CV is provided at a side of a cylinder head CH of an engine EG. The flow rate-controlling valve CV distributes cooling water flowing through the cylinder head CH by being pressurized by a water pump WP, to a heat exchanger HT for a heater, an oil cooler OC and a radiator RD through first to third pipes L11 to L13, and controls each flow rate of the first to third pipes L11 to L13. As shown in FIG. 2 to FIG. 4, the flow rate-controlling valve CV mainly has a housing 1 in which a reduction gear mechanism accommodating portion 14 having an oval shape in cross section and extending in a width direction is formed at one end side that is opposite side to where the cylinder head CH is attached and in which a substantially cylindrical valve body accommodating portion 13 is connected to an inside surface of the reduction gear mechanism accommodating portion 14 at one end side in the width direction of the reduction gear mechanism accommodating portion 14, a rotation shaft 2 that is inserted between the valve body accommodating portion 13 and the reduction gear mechanism accommodating portion 14 and is rotatably supported by a bearing 6 provided between the portions 13 and 14, a substantially cylindrical valve body 3 that is fixed to one end part of the rotation shaft 2 so as to be able to integrally rotate with the rotation shaft 2 and is rotatably accommodated in the valve body accommodating portion 13, an electric motor 4 to drive the valve body 3, which is disposed parallel to the valve body accommodating portion 13 and fixed to the inside surface of the reduction gear mechanism accommodating portion 14 so that an output shaft 4b of the electric motor 4 faces an inside of the reduction gear mechanism accommodating portion 14 at the other end side in the width direction of the reduction gear mechanism accommodating portion 14, and a reduction gear mechanism 5 that is placed between the output shaft 4b of the electric motor 4 and the rotation shaft 2 and reduces a rotation speed of the output shaft 4b of the electric motor 4 then transmits it to the rotation shaft 2.

The housing 1 is a housing that is cast with aluminum alloy material. The housing 1 has a first housing 11 that mainly forms the valve body accommodating portion 13 and a second housing 12 that mainly forms the reduction gear mechanism accommodating portion 14. The both housings 11 and 12 are held and fixed together by a plurality of square bracket-shaped clips 7 which are fitted to outer peripheral edge portions of the housings 11 and 12.

The first housing 11 is provided, at one end thereof, with an introduction port 10 as a main communication port which communicates with the cylinder head CH and introduces the cooling water from the cylinder head CH to the first housing 11. The first housing 11 is fixed to the cylinder head CH through a first flange portion 11a that is formed in an outer periphery of the first housing 11. In addition, the other end side of the first housing 11 is closed by an end wall 11b which defines the reduction gear mechanism accommodating portion 14, and is joined to the second housing 12 through a second flange portion 11c that is integrally formed with the end wall 11b. In addition, a shaft insertion hole 11d through which the rotation shaft 2 is supported by insertion of the rotation shaft 2 penetrates one end side region in the width direction of the end wall 11b. Further, a motor insertion hole (a motor fitting hole) 11e through which an inner end part (an end part of the output shaft 4b side) of the electric motor 4 is supported by insertion and fitting of the end part of the output shaft 4b side penetrates the other end side region in the width direction of the end wall 11b.

As shown in FIG. 1 to FIG. 5, the valve body accommodating portion 13 is provided, at an outer peripheral portion thereof, with substantially cylindrical first to third discharge ports E1 to E3 which are first to third communication ports connecting to the first to third pipes L11 to L13. Each of the first to third discharge ports E1 to E3 has a predetermined different inner diameter, and projects from the outer peripheral portion along a radial direction of the valve body accommodating portion 13. That is, the first discharge port (a first outlet port or a first delivery port) E1 having a medium diameter, which connects to the heater heat exchanger HT, and the second discharge port (a second outlet port or a second delivery port) E2 having a small diameter, which connects to the oil cooler OC, are arranged parallel so as to be adjacent to each other along an axial direction of the valve body accommodating portion 13. The first discharge port E1 is provided at the end wall 11b side, while the second discharge port E2 is provided at the introduction port 10 side. On the other hand, the third discharge port (a third outlet port or a third delivery port) E3 having a large diameter, which connects to the radiator RD, is provided in a different circumferential direction position from the first and second discharge ports E1 and E2 and is set so as to overlap with the first and second discharge ports E1 and E2 in the axial direction.

Cylindrical first to third seal holding members H1 to H3 are respectively fitted to base end sides of the first to third discharge ports E1 to E3. Circular first to third seal members S1 to S3 to liquid-tightly seal a gap between each of the discharge ports E1 to E3 and an outer peripheral surface (after-mentioned first to third axial direction regions X1 to X3) of the valve body 3 are provided at end parts of the first to third seal holding members H1 to H3 opposing to the valve body 3 so as to make sliding contact with the outer peripheral surface of the valve body 3. More specifically, the seal members S1 to S3 are respectively inserted into and fitted to first to third seal holding portions H1a to H3a, each of which is formed by cutting out an inner peripheral edge of the end part of the first to third seal holding members H1 to H3. Then, the seal holding members H1 to H3, to which the seal members S1 to S3 are fitted, are press-fitted to inner peripheral surfaces of first to third seal attachment portions E1a to E3a that are formed at base end parts of the discharge ports E1 to E3 and have a reduced diameter step.

In addition, first to third adapter holding portions E1b to E3b to accommodate and hold cylindrical first to third adapters A1 to A3 connecting to each pipe (not shown) are provided at tip end sides of the first to third discharge ports E1 to E3. The adapters A1 to A3 are respectively press-fitted to inner peripheral surfaces of the adapter holding portions E1b to E3b by being inserted into and fitted to the adapter holding portions E1b to E3b so as to butt to step parts of the seal attachment portions E1a to E3a.

Here, all of the first to third adapters A1 to A3 are formed into the same shape. The first to third adapters A1 to A3 have first to third held portions A1a to A3a which are respectively press-fitted to the adapter holding portions E1b to E3b and first to third pipe attachment portions A1b to A3b to which the first to third pipes L11 to L13 are fixed. With this configuration, the pipes L11 to L13 made of material having flexibility such as rubber are respectively fitted onto outer peripheral surfaces of the pipe attachment portions A1b to A3b and fastened by band members (not shown) winding around their outer peripheral surfaces.

Figure 6:
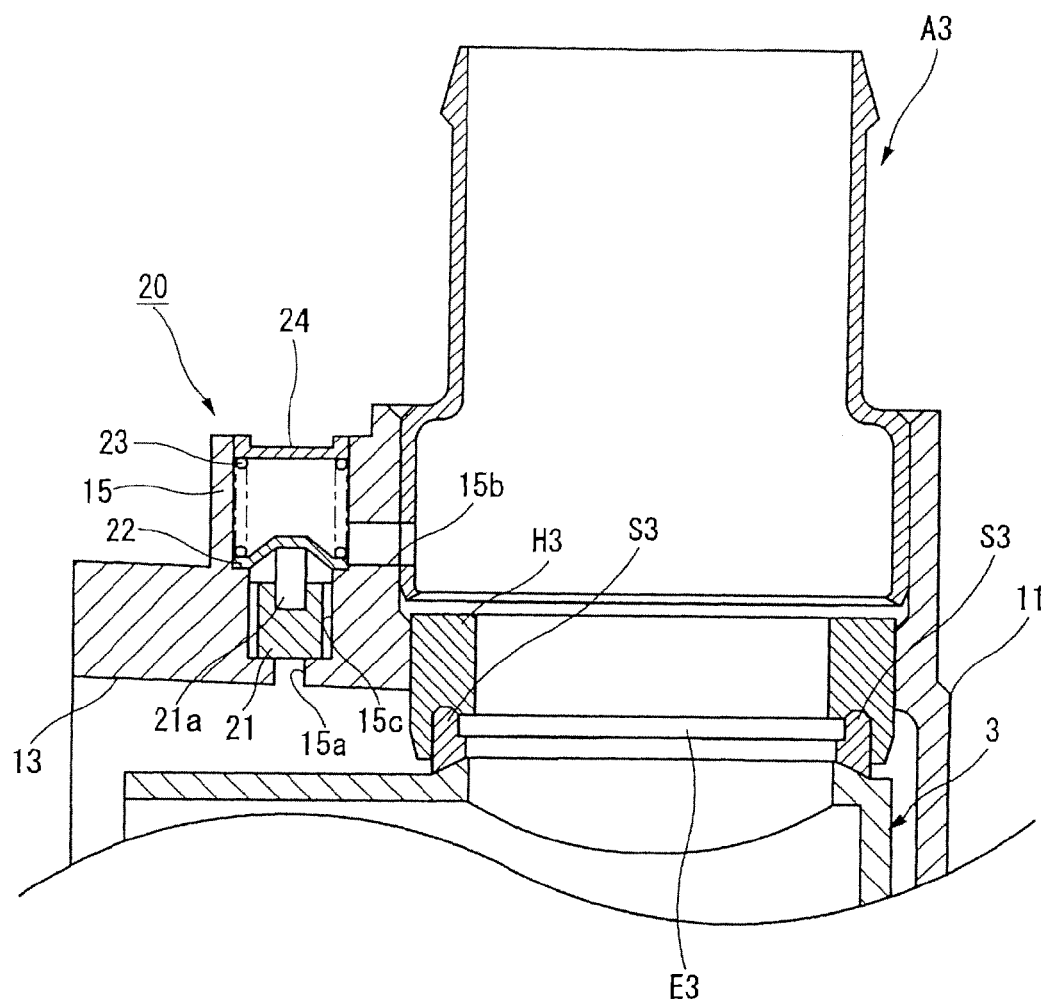
FIG. 6 is a longitudinal sectional view of a fail-safe device shown in FIG. 2.

In addition, a fail-safe device 20 (see FIG. 6) capable of connecting the valve body accommodating portion 13 and the third discharge port E3 in an emergency in which the valve body 3 cannot be driven due to failure of an electrical system is provided at a side part of the third discharge port E3 in the first housing 11. The fail-safe device 20 is capable of preventing overheat of the engine EG by securing supply of the cooling water to the radiator RD, even if the valve body 3 is in an unmovable state. As shown in FIG. 2 and FIG. 6, the fail-safe device 20 mainly has a thermo-element 21, a valve plate member 22, a coil spring 23 and a plug 24. The fail-safe device 20 operates on the same principle as a well-known wax-pellet thermostat.

More specifically, a cylindrical valve accommodating portion 15 having an inflow hole 15a whose one end side located at an out end side opens to the outside and whose other end side communicates with the valve body accommodating portion 13 is provided at the first housing 11 beside the third discharge port E3. Further, an outflow hole 15b that communicates with the third discharge port E3 is formed by penetrating a side of the valve accommodating portion 15. One end side opening part of the valve accommodating portion 15 is closed by the plug 24. A thermo-accommodating portion 15c formed into a reduced diameter step is provided at the other end side of the valve accommodating portion 15 in an axial direction inner position with respect to the outflow hole 15b. The thermo-element 21 is then accommodated in the thereto-accommodating portion 15c. In addition, the valve plate member 22 is provided so as to close an opening part of the thermo-accommodating portion 15c at the outflow hole 15b side. The coil spring 23 is elastically interposed between the valve plate member 22 and the plug 24. When temperature exceeds a predetermined temperature, wax filling an inside of the thermo-element 21 expands, then a rod 21a sticks out forward. With this working, the valve plate member 22 is pressed and retracted against an urging force of the coil spring 23, the inflow hole 15a thus communicates with the outflow hole 15b. In addition to this temperature increase, also in a case where pressure of the cooling water exceeds a predetermined pressure, the valve plate member 22 is pressed and retracted against the urging force of the coil spring 23, and the inflow hole 15a communicates with the outflow hole 15b.

As shown in FIG. 2 to FIG. 4, the second housing 12 has a square bracket-shape in cross section, formed so that one end side of the second housing 12, which faces to the first housing 11, opens. This opening portion is connected to the first housing 11 by being fitted to a projecting portion that is formed on an outer peripheral edge of the second flange portion 11c, then the reduction gear mechanism accommodating portion 14 is defined. Here, with regard to the connection of the housings 11 and 12, the inside of the reduction gear mechanism accommodating portion 14 is liquid-tightly sealed by setting a ring-shaped seal member SL between the projecting portion of the first housing 11 and the opening portion of the second housing 12.

The rotation shaft 2 is rotatably supported by the bearing 6 that is provided in the shaft insertion hole 11d through a bearing portion 2a provided in a middle part, in the axial direction, of the rotation shaft 2. One end part of the rotation shaft 2 is formed as a valve body attachment portion 2b for fixing the rotation shaft 2 to the valve body 3, which has substantially the same diameter as that of the bearing portion 2a. The other end part of the rotation shaft 2 is formed as a gear attachment portion 2c for fixing the rotation shaft 2 to an after-mentioned third gear G3 of the reduction gear mechanism 5, which has a relatively smaller diameter than that of the bearing portion 2a. Moreover, a large diameter seal portion 2d having enlarged diameter steps is provided between the bearing portion 2a and the valve body attachment portion 2b. A pair of first and second seal rings R1 and R2 are arranged in series on an outer periphery of this seal portion 2d. By these seal rings R1 and R2, the cooling water in the valve body accommodating portion 13 is prevented from flowing into the reduction gear mechanism accommodating portion 14.

Here, regarding the seal rings R1 and R2, it is preferable that outer peripheral surfaces of the seal rings R1 and R2 undergo a low friction treatment that reduces a frictional resistance (a sliding resistance), such as fluororesin coating. With this treatment, the sliding resistance of the rotation shaft 2 is reduced, and power consumption of the electric motor 4 is reduced.

In addition, the seal portion 2d is provided, between the seal rings R1 and R2, with a part that opens to and connects to a drain hole 11f penetrating the shaft insertion hole 11d of the first housing 11 in a radial direction. Therefore, the cooling water that might leak between the seal rings R1 and R2 from the valve body accommodating portion 13 side over a seal portion of the first seal ring R1 can be discharged to the outside through this drain hole 11f.

Figure 7:
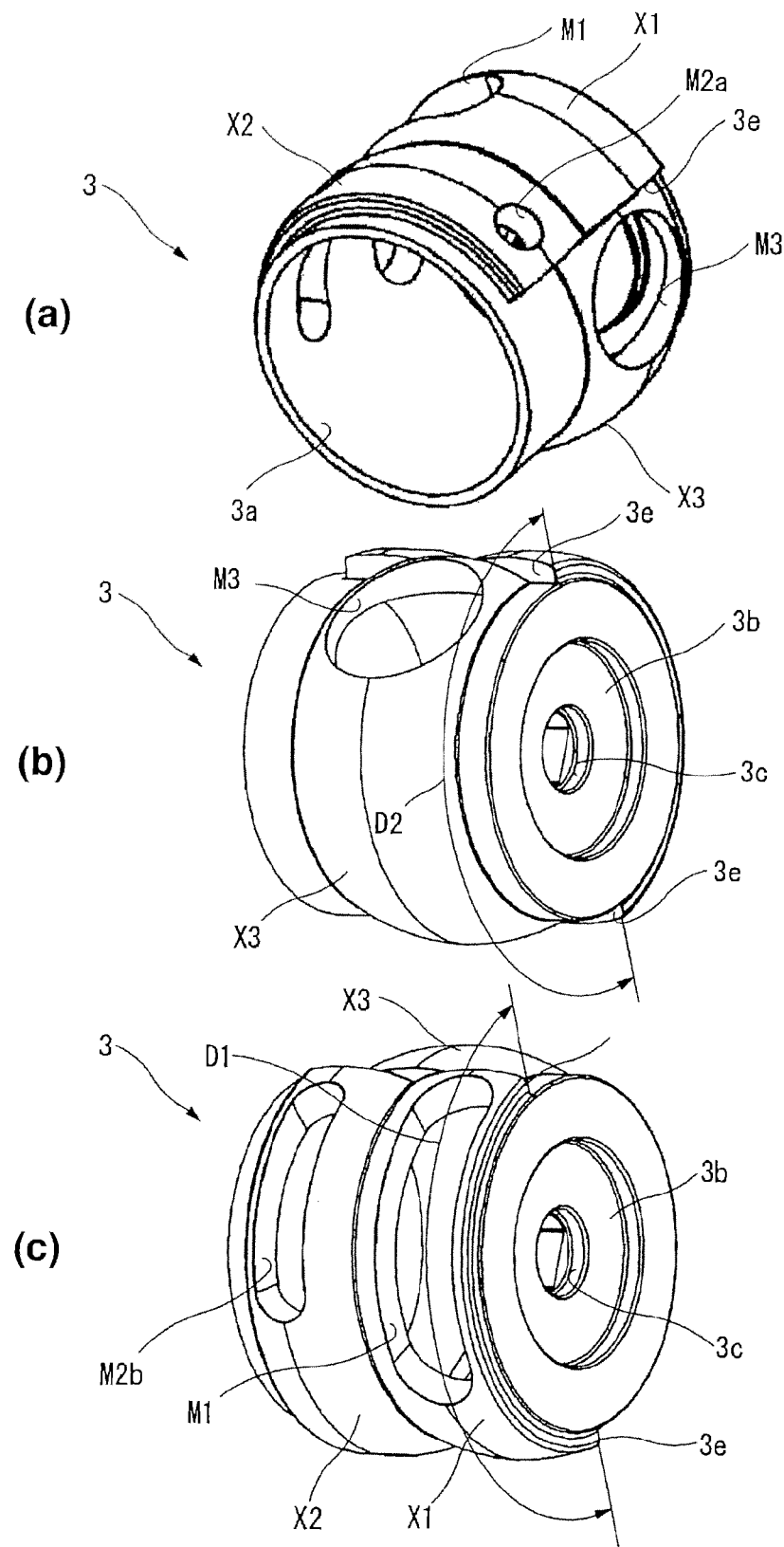
FIGS. 7(a) to 7(c) are perspective views showing only a valve body shown in FIG. 2, viewed from different viewpoint.

As shown in FIG. 2, FIG. 4 and FIG. 7, one end in the axial direction of the valve body 3 is opened as an inflow port 3a to take the cooling water into its inner peripheral side space from the introduction port 10 of the first housing 11. The other end in the axial direction of the valve body 3 is closed by an end wall 3b. A cylindrical shaft fixing portion 3c for fixing the valve body 3 to the rotation shaft 2 penetrates, along the axial direction, a center part of the end wall 3b, which corresponds to an axial center of the valve body 3. The valve body 3 is press-fitted onto an outer periphery of the valve attachment portion 2b of the rotation shaft 2 through an insert member 3d made of a metal material that is fixedly provided on the shaft fixing portion 3c.

The valve body 3 operates by rotation movement within a range of an angle of about 180 degrees. The valve body 3 has different shapes according to each region in its axial direction and circumferential direction. That is, in a first semicircle region D1 of the valve body 3, which faces to the first and second discharge ports E1 and E2, an oval hole-shaped first opening portion M1 is formed, along the circumferential direction, in a first axial direction position P1 that is a same axial direction center as the first discharge port E1 in the first axial direction region X1 located at the axial direction other end side (the end wall 3b side). The first opening portion M1 is set to an axial direction width so as to completely overlap with the first discharge port E1 in the axial direction. Further, a second opening portion M2 including a second perfect circle opening portion M2a and a second oval opening portion M2b having an oval hole shape are formed in a second axial direction position P2 that is a same axial direction center as the second discharge port E2 in the second axial direction region X2 located at the axial direction one end side (the introduction port 10 side). The second perfect circle opening portion M2a and the second oval opening portion M2b are set to an axial direction width so as to completely overlap with the second discharge port E2 in the axial direction. On the other hand, in a second semicircular region D2 of the valve body 3, which faces to the third discharge port E3, a circular third opening portion M3 is formed in a third axial direction position P3 that is a same axial direction center as the third discharge port E3 in the third axial direction region X3 located in the middle of the axial direction. The third opening portion M3 is set to an axial direction width so as to completely overlap with the third discharge port E3. Moreover, the first to third axial direction regions X1 to X3 have a spherical shape in longitudinal cross section, namely that the first to third axial direction regions X1 to X3 are shaped into a curved surface shape having a same curvature C, and the curvature C is the same as a radius of rotation of the valve body 3 (the curvature C corresponds to the radius of rotation of the valve body 3).

Figure 8:
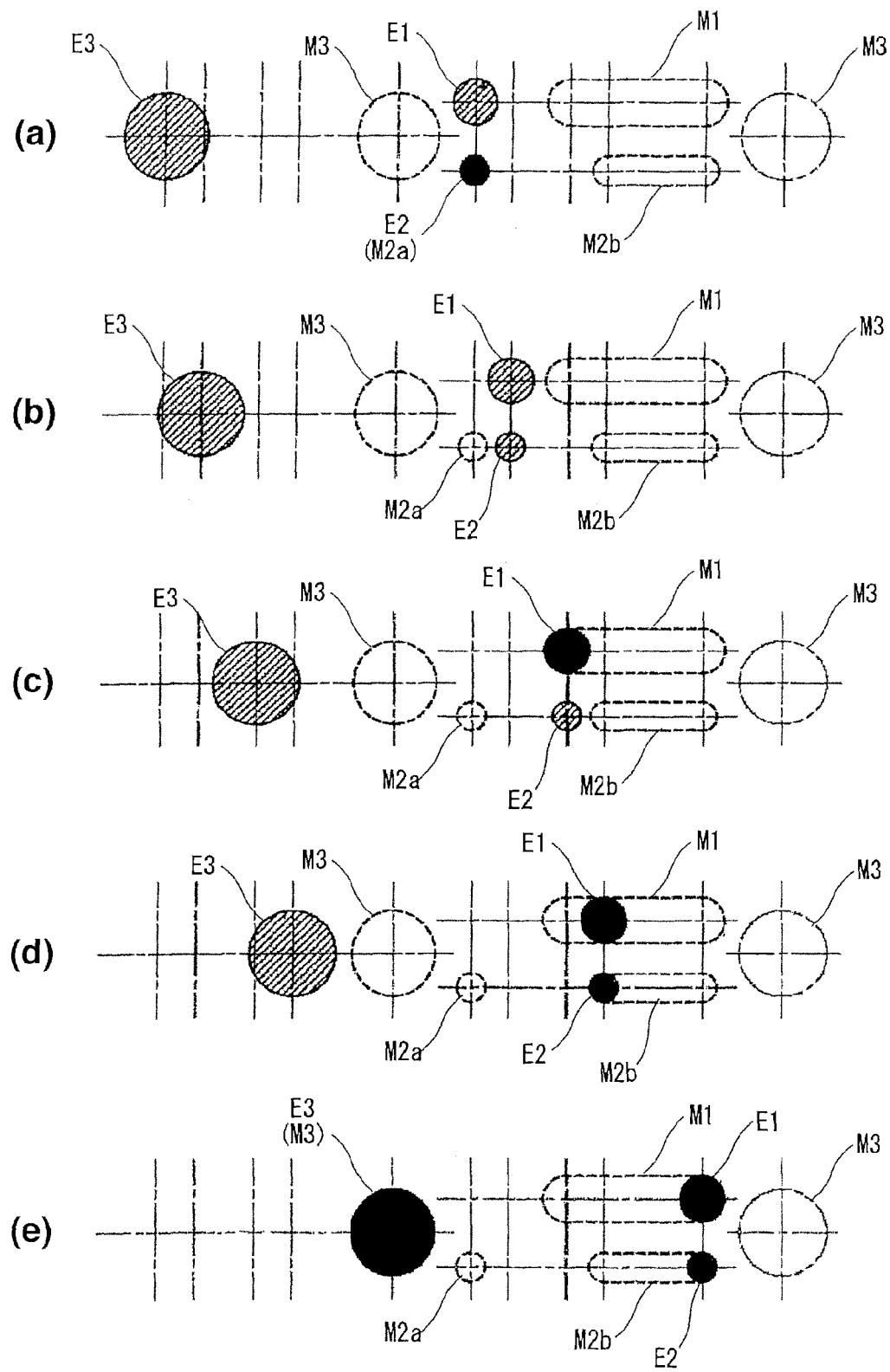
FIGS. 8(a) to 8(e) are drawings showing developed views of a valve body accommodating portion to explain an operating condition of the flow rate-controlling valve of the present invention.

Here, each shape and each circumferential direction position of the first to third opening portions M1 to M3 are set so that their communication states with the first to third discharge ports E1 to E3 are changed by the rotation of the valve body 3 in an order from first to fifth states, which are shown in FIG. 8 and described later. With the above setting, a circumferential length of the valve body 3, i.e. an outer diameter of the valve body 3, can be minimized.

In addition, by the fact that the first to third axial direction regions X1 to X3 of the valve body 3 are formed into the spherical shape, step portions 3e, 3e are formed at boundary parts between the semicircle regions D1 and D2. With this, when the valve body 3 is rotated, it is possible to restrain or limit the rotation of the valve body 3 by using each of these step portions 3e, 3e as a stopper. These step portions 3e, 3e are necessarily formed when forming the valve body 3. Thus, by using these step portions 3e, 3e, there is no need to specially provide the stopper, and this leads to cost reduction etc.

As for the electric motor 4, as shown in FIG. 2 and FIG. 4, by inserting an inner end part (an end part at the output shaft 4b side) of a motor housing 4a as an exterior into the motor insertion hole 11e, the electric motor 4 is fixed to the first housing 11. The electric motor 4 is controlled by a vehicle-mounted electronic controller (ECU) 8, and controls the rotation of the valve body 3 according to a vehicle operating condition, which therefore realizes proper distribution of the cooling water to the radiator RD etc.

The reduction gear mechanism 5 has a circular first gear G1 as a driving gear that is fixed to an outer periphery of the output shaft 4b of the electric motor 4 so as to be able to integrally rotate with the output shaft 4b and has a first teeth portion G1a on an outer periphery of the first gear G1, a circular second gear G2 as an intermediate gear that is fixed to a support shaft 9 so as to be able to integrally rotate with the support shaft 9 rotatably supported at a middle position in the width direction of the first housing 11 and has a second teeth portion G2a meshing with the first teeth portion G1a on an outer periphery of the second gear G2, and the substantially semicircular third gear G3 as a driven gear that is fixed to an outer periphery of the gear attachment portion 2c of the rotation shaft 2 so as to be able to integrally rotate with the rotation shaft 2 and has a third teeth portion G3a meshing with the second teeth portion G2a. With this gear arrangement, the second gear G2 is driven and rotated by a driving force of the electrical motor 4 that is transmitted from the first gear G1, and the third gear G3 is rotated within a predetermined angle range by a driving force that is transmitted from the second gear G2. Upon the rotation of the third gear G3, its rotation is restrained or limited so as not to exceed the predetermined angle range by contact of each of both ends in a circumferential direction of the third gear G3 with an arcuate stopper portion 11g projecting from a surface of the end wall 11b facing to the second housing 12.

In the following, a specific operating condition of the flow rate-controlling valve according to the present embodiment is explained based on FIG. 8. For the convenience of the explanation, to distinguish a relative relationship between the discharge ports E1 to E3 and the respective opening portions M1 to M3, in FIG. 8, the first to third opening portions M1 to M3 of the valve body 3 are drawn by a broken line, the first to third discharge ports E1 to E3 of the first housing 11 are shown by hatching, and a state in which the E1 to E3 communicate with M1 to M3 respectively is painted black.

That is, the electric motor 4 is controlled by control current calculated based on the vehicle operating condition and outputted from the electronic controller 8, and the rotation position (a phase) of the valve body 3 of the flow rate-controlling valve is controlled so that the relative relationship between the discharge ports E1 to E3 and the respective opening portions M1 to M3 is in the following each state according to the vehicle operating condition.

In a first state shown in FIG. 8 (a), only the second opening portion M2 (M2a) is in a communication state. The first and third opening portion M1 and M3 are in a non-communication state. With this, in the first state, based on this communication state, the cooling water is supplied to only the oil cooler OC from the second discharge port E2 through the second pipe L12. Further, by changing an overlapping amount between E2 and M2 with M2 shifted with respect to E2, it is possible to change a supply rate (a supply amount) to the oil cooler OC.

Next to the first state, in a second state shown in FIG. 8 (b), all of the first to third opening portions M1 to M3 are in the non-communication state with the discharge ports E1 to E3. With this, in the second state, the cooling water is not supplied to any of the heater heat exchanger HT, the oil cooler OC and the radiator RD.

Next to the second state, in a third state shown in FIG. 8 (c), only the first opening portion M1 is in the communication state. The second and third opening portions M2 and M3 are in the non-communication state. Therefore, in the third state, based on this communication state, the cooling water is supplied to only the heater heat exchanger HT from the first discharge port E1 through the first pipe L11. Further, by changing an overlapping amount between E1 and M1 with M1 shifted with respect to E1, it is possible to change a supply rate (a supply amount) to the heater heat exchanger HT.

Next to the third state, in a fourth state shown in FIG. 8 (d), only the third opening portion M3 is in the non-communication state. The first and second opening portions M1 and M2 (M2b) are in the communication state. Therefore, in the fourth state, based on these communication states, the cooling water is supplied to the heater heat exchanger HT and the oil cooler OC from the first and second discharge ports E1 and E2 through the first and second pipes L11 and L12. Further, by changing overlapping amounts between E1 and M1 and between E2 and M2 with M1 and M2 shifted with respect to E1 and E2 respectively, it is possible to change supply rates (supply amounts) to the heater heat exchanger HT and to the oil cooler OC.

Next to the fourth state, in a fifth state shown in FIG. 8 (e), all of the first to third opening portions M1 to M3 are in the communication state with the discharge ports E1 to E3. Therefore, in the fifth state, the cooling water is supplied to all of the heater heat exchanger HT, the oil cooler OC and the radiator RD. Further, by changing overlapping amounts between E1 and M1, between E2 and M2 and between E3 and M3 with M1, M2 and M3 shifted with respect to E1, E2 and E3 respectively, it is possible to change the supply rates (the supply amounts) to the heater heat exchanger HT, to the oil cooler OC and to the radiator RD.

From the foregoing, the flow rate-controlling valve according to the present embodiment is configured so that the third opening portion M3 that is one of the first to third opening portions M1 to M3 of the valve body 3 overlaps with remaining first and second opening portions M1 and M2 in the axial direction. Therefore, it is possible to reduce a size in the axial direction of the valve body 3, and this can realize a compact valve body in overall size.

Especially, in the present embodiment, the first opening portion M1 and the second opening portion M2 respectively having a relatively small width in the axial direction are arranged parallel in the axial direction. Further, the third opening portion M3 having a largest width, which is larger than M1 and M2, in the axial direction is arranged so as to overlap with the first and second opening portions M1 and M2 in the axial direction. Therefore, by the reduction of the axial direction size of the valve body 3, the compact valve body in overall size can be effectively realized.

In addition, in the case of the present embodiment, each outer peripheral area of the opening portions M1 to M3, i.e. each of the axial direction regions X1 to X3 which sliding-contacts with the seal members S1 to S3 set at the discharge portions E1 to E3 respectively, is formed into the same spherical shape (the same curved surface shape having the same curvature C and the radius of rotation). Consequently, contact line pressures of the axial direction regions X1 to X3 as the outer peripheral areas of the opening portions M1 to M3 to the respective circular seal members S1 to S3 can be uniform, and excellent liquid-tightness to the respective seal members S1 to S3 can be ensured by an extremely simple structure without requiring a complicated structure. As a result, the flow rate control of the cooling water is properly performed while suppressing leak of the cooling water at each seal member to the minimum.

Further, in the case of the present embodiment, as described above, since arrangement and configuration etc. of the opening portions M1 to M3 of the valve body 3 are made so that their communication states with the respective discharge ports E1 to E3 in the operating condition are shifted in the order from the first to fifth states, the outer diameter of the valve body 3 can be set to the minimum. This can reduce not only the size in the axial direction but a size in the radial direction, and contributes to reduction in the overall size of the valve body.

Moreover, with regard to the second and third opening portions M2 and M3, by continuously forming the second and third opening portions M2 and M3 as the oval hole along the circumferential direction, as compared with a case where a plurality of perfect circle holes are provided in a short span, it is possible to efficiently form the opening portions M2 and M3. This brings about reduction of the manufacturing cost.

Furthermore, with regard to the second opening portion M2 having the second perfect circle opening portion M2a and the second oval opening portion M2b, a plurality of opening portions in the circumferential direction are provided by these opening portion M2a and M2b. It is thus possible to reduce an opening area that is not necessary to form a flow passage configuration, and to suppress lowering of rigidity of the valve body 3.

[Second Embodiment]

Figure 9:
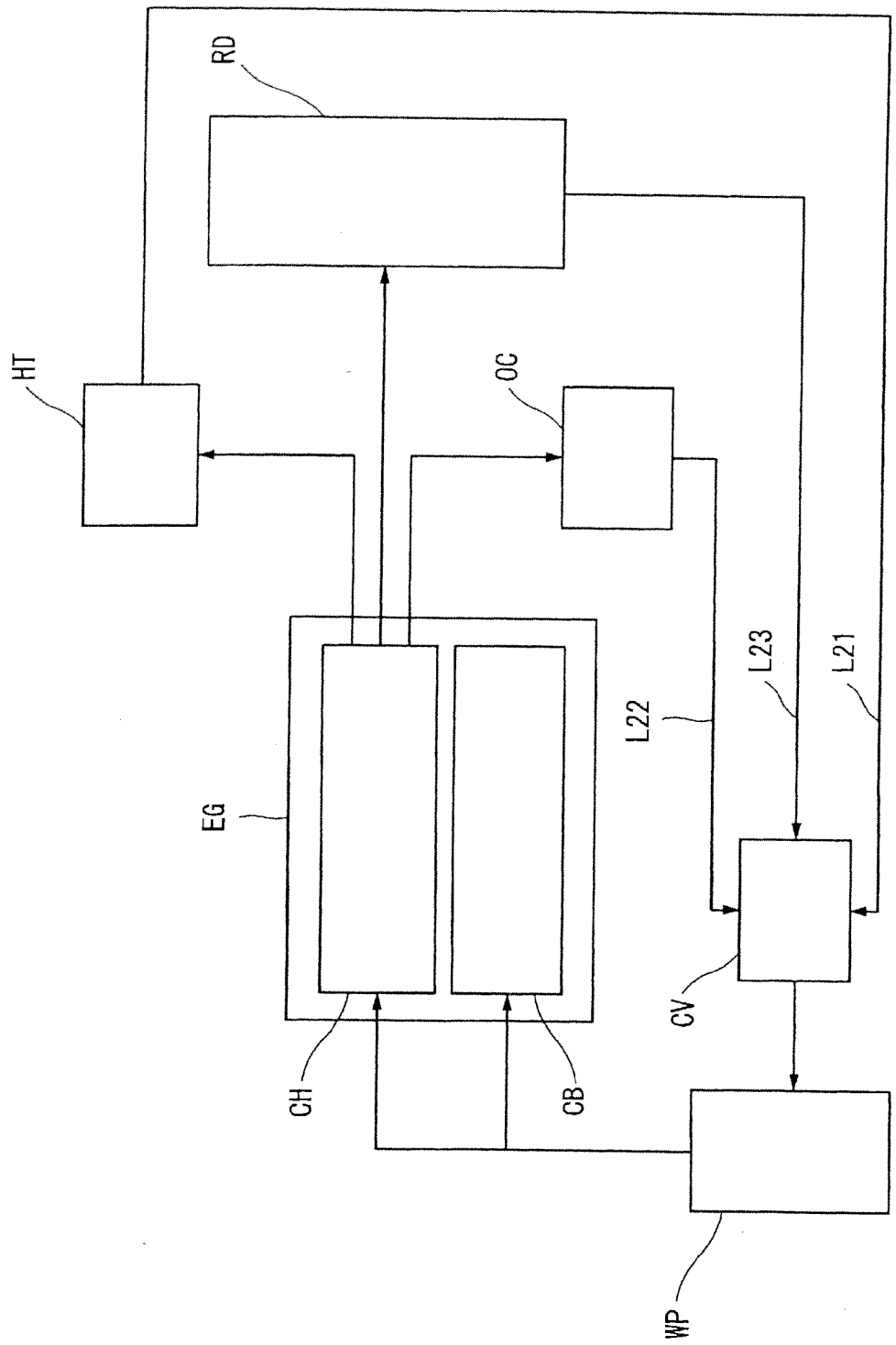
FIG. 9 is a schematic system diagram of a circulation system of the cooling water for the vehicle, showing a second embodiment of the flow rate-controlling valve according to the present invention.

FIG. 9 shows a second embodiment of the flow rete-controlling valve according to the present invention, in which a configuration of the circular system of the cooling water of the first embodiment is changed. Also in the present embodiment, since a configuration of the flow rate-controlling valve CV is the same as the first embodiment, the same element or component is denoted by the same reference sign, and specific explanations are omitted.

That is, in the present embodiment, the flow rate-controlling valve CV is provided between first to third pipes L21 to L23 as flow passages, in which the cooling water flows through the heater heat exchanger HT, the oil cooler OC and the radiator RD, and the water pump WP. And by controlling a confluence rate (a confluence amount) of the cooling water from the first to third pipes L21 to L23, each flow rate (each flow amount) of the heater heat exchanger HT, the oil cooler OC and the radiator RD is controlled.

Because the water pump WP and the flow rate-controlling valve CV are arranged contiguously with each other, the present embodiment has an advantage of integrally connecting the water pump WP and the flow rate-controlling valve CV with each other. In addition, with the above configuration, because pressure of the cooling water that is introduced into the flow rate-controlling valve CV becomes low as compared with the first embodiment, line pressure related to sealing performance of the seal members S1 to S3 to the axial direction regions X1 to X3 and sealing performance of the first seal ring R1 to the shaft insertion hole 11d can be set to be lower. In particular, a good response at a time of start can be obtained, and a size of the electric motor 4 can be small and each of the seals can be simplified.

[Third Embodiment]

Figure 10:
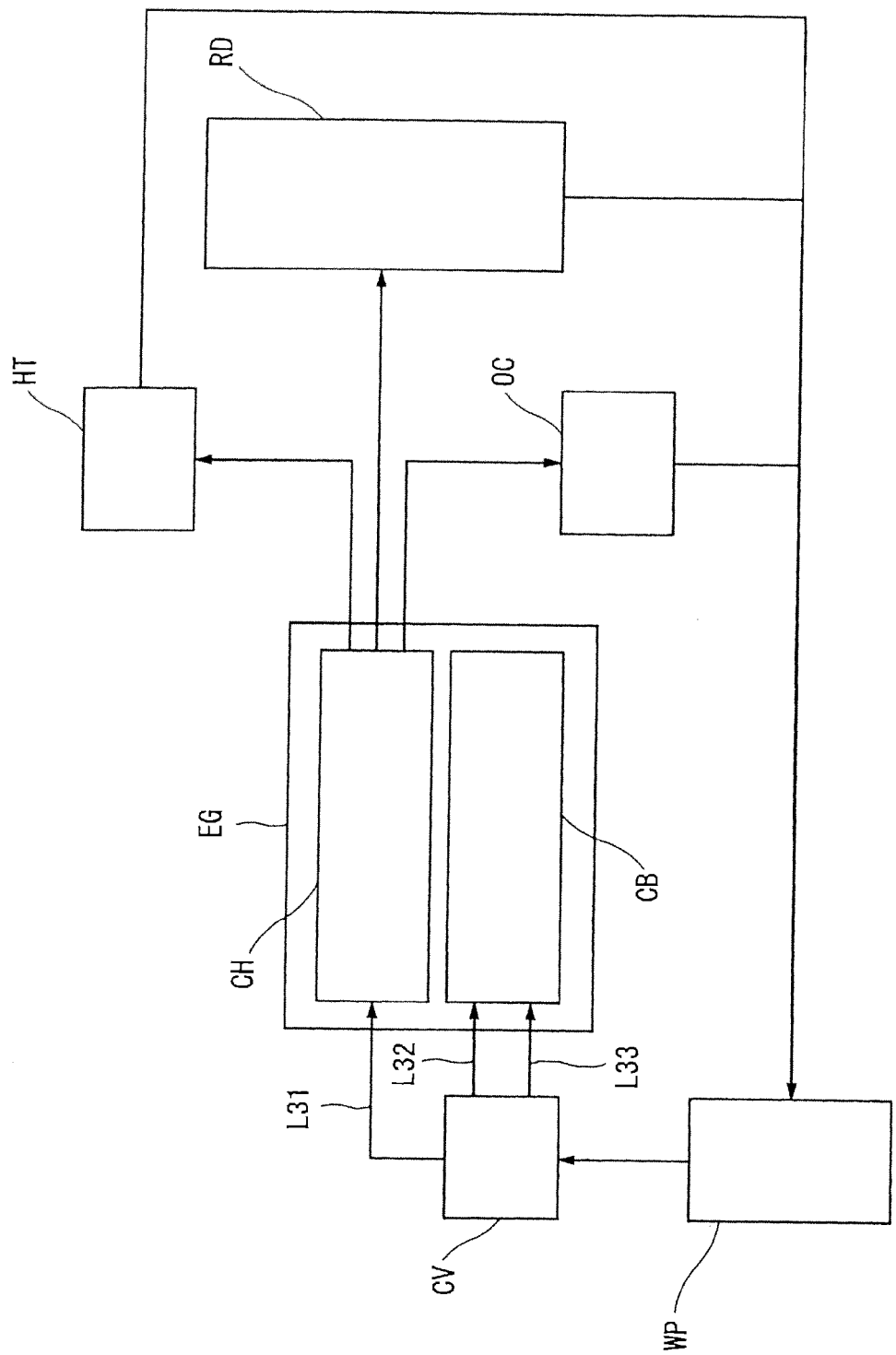
FIG. 10 is a schematic system diagram of a circulation system of the cooling water for the vehicle, showing a third embodiment of the flow rate-controlling valve according to the present invention.

FIG. 10 shows a third embodiment of the flow rate-controlling valve according to the present invention, in which the configuration of the circular system of the cooling water of the first embodiment is changed. Also in the present embodiment, since a configuration of the flow rate-controlling valve CV is the same as the first embodiment, the same element or component is denoted by the same reference sign, and specific explanations are omitted.

That is, in the present embodiment, the flow rate-controlling valve CV is provided between the water pump WP and the engine EG. The flow rate-controlling valve CV distributes the cooling water that is pressurized by the water pump WP to the cylinder head CH and a cylinder block CB of the engine EG through first to third pipes L31 to L33, and controls these flow rates (these flow amounts).

Also in the case of the present embodiment, because the water pump WP and the flow rate-controlling valve CV are arranged contiguously with each other, the present embodiment has an advantage of integrally connecting the water pump WP and the flow rate-controlling valve CV with each other. Moreover, the present embodiment has the first pipe L31 to distribute the cooling water to the cylinder head CH which requires high cooling due to relatively high temperature in the engine EG parts, and has the second and third pipes L32 and L33 to distribute the cooling water to the cylinder block CB whose required temperature is different depending on upper and lower portions of a cylinder bore. This therefore leads to a proper temperature control of the engine EG.

The present invention is not limited to the configuration of the embodiments described above. For example, regarding detailed configuration of transmission means (a transmission route) of a driving force from the electric motor 4 to the valve body 3 and a shape of the housing 1, which is not directly related to features of the present invention, and also regarding detailed configuration of sizes of the first to third discharge ports E1 to E3, shapes of the first to third opening portions M1 to M3, the number of these elements and positions (positions in the circumferential direction) of these elements, which is related to the features of the present invention, as long as the above-mentioned working effect can be obtained, these can be freely changed and modified according to specifications etc. of the vehicle in which the flow rate-controlling valve of the present invention is mounted.

In addition, in the above embodiments, although the present invention has been explained as an example in which the flow rate-controlling valve is applied to the circular system of the cooling water, it is needless to say that the flow rate-controlling valve can be applied to not only the cooling water but various fluid such as lubricating oil.

In the following, technical ideas which are not disclosed in scope of claims and can be understood from the embodiments described above are explained.

(a) In a flow rate-controlling valve according to claims 1 to 3, the third opening portion is provided at a first opening portion side in the axial direction.

(b) In the flow rate-controlling valve according to claims 1 to 3, the first to third opening portions are formed by an oval hole extending along the circumferential direction of the valve body or a circular hole.

Especially by continuously forming the first and second opening portions M1 and M2 as the oval hole, as compared with the case where a plurality of the perfect circle holes are provided, the manufacturing cost is reduced.

(c) In the flow rate-controlling valve according to claims 1 to 3, at least one of the first to third opening portions is provided with a plurality of opening portions along the circumferential direction.

It is possible to reduce an opening area that is not necessary to form the flow passage configuration, and to suppress lowering of rigidity of the valve body by these configurations.

(d) In the flow rate-controlling valve according to claim 1, a maximum opening area of the third opening portion to the third outlet port is set to be larger than those of the first and second opening portions to the first and second outlet ports.

(e) In the flow rate-controlling valve described in (d), at least the third outlet port is provided on an opposite side to the first and second outlet ports with respect to an axis center of the valve body.

(f) In the flow rate-controlling valve described in (d), the first opening portion communicates with the outlet port that is connected to one of an oil cooler and a heater heat exchanger, and the second opening portion communicates with the outlet port that is connected to the other of the oil cooler and the heater heat exchanger, and the third opening portion communicates with the outlet port that is connected to a radiator.

(g) In the flow rate-controlling valve described in (f), the maximum opening area of the second opening portion to the second outlet port is set to be larger than that of the first opening portion to the first outlet port.

(h) In the flow rate-controlling valve according to claim 1, the first opening portion communicates with the outlet port that is connected to an oil cooler, and the second opening portion communicates with the outlet port that is connected to a heater heat exchanger.

(i) In the flow rate-controlling valve according to claim 2 or 3, the valve body is provided, at an axial direction one end side thereof, with an inflow port into which the cooling water flows from the introduction port, and the other end side of the valve body is closed.

(j) In the flow rate-controlling valve according to claims 1 to 3, each peripheral region of the first to third opening portions of the valve body is formed into a spherical shape.

A stable sealing performance at each of the communication ports etc. is secured by these configurations.

(k) In the flow rate-controlling valve described in (j), curvatures of spherical parts of the first to third opening portions are set to be substantially the same.

(l) In the flow rate-controlling valve described in (j), radii of rotation of spherical parts of the first to third opening portions are set to be substantially the same.

(m) In the flow rate-controlling valve described in (j), an opening edge of each communication port is liquid-tightly sealed by a circular seal member.

(n) In the flow rate-controlling valve according to claim 1, the flow rate-controlling valve has following operating states; a first state in which only the second opening portion communicates with the second outlet port and the first and third opening portions are in a non-communication state with the first and third outlet ports respectively; a second state in which all of the first to third opening portions are in the non-communication state with the first to third outlet ports respectively; a third state in which only the first opening portion communicates with the first outlet port and the second and third opening portions are in the non-communication state with the second and third outlet ports respectively; a fourth state in which the first and second opening portions communicate with the first and second outlet ports respectively and only the third opening portion is in the non-communication state with the third outlet port; and a fifth state in which all of the first to third opening portions communicate with the first to third outlet ports respectively.

(o) In the flow rate-controlling valve described in (n), the first to fifth states are continuously shifted according to rotation of the valve body.

(p) In the flow rate-controlling valve described in (n), after the first state is shifted to the second state, the second state is shifted to the third state, and after the third state is shifted to the fourth state, the fourth state is shifted to the fifth state.

Since configuration is made so that the states are shifted in the order, the outer diameter of the valve body can be set to the minimum. This contributes to reduction in the size of the valve body.

(q) In the flow rate-controlling valve according to claims 1 to 3, the actuator is an electric motor.

EXPLANATION OF SIGNS

1: housing
3: valve body
4: electric motor (an actuator)
13: valve body accommodating portion
10: introduction port
E1 to E3: first to third discharge ports
M1 to M3: first to third opening portions

The invention claimed is:
1. A flow rate-controlling valve, comprising:
a housing having
a main communication port for introduction or discharge of cooling water, which is provided at a substantially cylindrical valve body accommodating portion; and
first to third communication ports which communicate with the valve body accommodating portion from a radial direction to introduce or discharge the cooling water into or from the valve body accommodating portion;

a substantially cylindrical valve body rotatably supported in the housing, the valve body having first to third opening portions whose overlap states with the respective first to third communication ports are changed according to a rotation position of the valve body; and an actuator controlling the rotation position of the valve body, and the first and second opening portions being arranged parallel in a rotation axial direction on an outer peripheral surface of the valve body, the third opening portion being arranged in a different circumferential direction position from the first or second opening portion on the outer peripheral surface of the valve body so that at least a part of the third opening portion overlaps with the first or second opening portion in the rotation axial direction, and a third axial direction position that is a same axial direction center as the third opening portion is set between a first axial direction position that is a same axial direction center as the first opening portion and a second axial direction position that is a same axial direction center as the second opening portion in the rotation axial direction.

2. The flow rate-controlling valve as claimed in claim 1, wherein:
the third opening portion is provided at a first opening portion side in the rotation axial direction.

3. The flow rate-controlling valve as claimed in claim 1, wherein:
the first to third opening portions are formed by a circular hole, and a maximum opening area of the third opening portion is set to be larger than those of the first and second opening portions.

4. The flow rate-controlling valve as claimed in claim 3, wherein:
the third opening portion is connected to a radiator.

5. The flow rate-controlling valve as claimed in claim 1, wherein:
a peripheral region of each of the first to third opening portions of the valve body is formed into a spherical shape.

6. The flow rate-controlling valve as claimed in claim 5, wherein:
the curvature of each of the spherical peripheral regions of the first to third opening portions of the valve body are substantially equal.

7. The flow rate-controlling valve as claimed in claim 5, wherein:
the radii of rotation of each of the spherical peripheral regions of the first to third opening portions are substantially equal.

8. The flow rate-controlling valve as claimed in claim 5, wherein:
an opening edge of each of the communication ports is liquid-tightly sealed by a circular seal member.

9. The flow rate-controlling valve as claimed in claim 1, wherein:
the actuator is an electric motor.

10. A flow rate-controlling valve comprising:
a housing having
an introduction port which introduces cooling water into a substantially cylindrical valve body accommodating portion; and first to third outlet ports, each of which communicates with an externally-connecting pipe and delivers the cooling water from the valve body accommodating portion;

a substantially cylindrical valve body rotatably supported in the housing, the valve body having first to third opening portions whose overlap states with the respective first to third outlet ports are changed according to a rotation position of the valve body; and an actuator controlling the rotation position of the valve body, and the first and second opening portions being arranged parallel in an axial direction on an outer peripheral surface of the valve body, and the third opening portion being arranged in a different circumferential direction position from the first or second opening portion on the outer peripheral surface of the valve body so that at least a part of the third opening portion overlaps with the first or second opening portion in the axial direction.

11. The flow rate-controlling valve as claimed in claim 10, wherein:
a maximum opening area of the third opening portion to the third outlet port is set to be larger than those of the first and second opening portions to the first and second outlet ports.

12. The flow rate-controlling valve as claimed in claim 11, wherein:
at least the third outlet port is provided on an opposite side to the first and second outlet ports with respect to an axis center of the valve body.

13. The flow rate-controlling valve as claimed in claim 11, wherein:
the first opening portion communicates with the outlet port that is connected to one of an oil cooler and a heater heat exchanger, and the second opening portion communicates with the outlet port that is connected to the other of the oil cooler and the heater heat exchanger, and the third opening portion communicates with the outlet port that is connected to a radiator.

14. The flow rate-controlling valve as claimed in claim 13, wherein:
the maximum opening area of the second opening portion to the second outlet port is set to be larger than that of the first opening portion to the first outlet port.

15. The flow rate-controlling valve as claimed in claim 10, wherein:
the first opening portion communicates with the outlet port that is connected to an oil cooler, and
the second opening portion communicates with the outlet port that is connected to a heater heat exchanger.

16. The flow rate-controlling valve as claimed in claim 10, wherein:
the valve body is provided, at an axial direction one end side thereof, with an inflow port into which the cooling water flows from the introduction port, and the other end side of the valve body is closed.

17. The flow rate-controlling valve as claimed in claim 10, wherein:
the flow rate-controlling valve has following operating states;
a first state in which only the second opening portion communicates with the second outlet port and the first and third opening portions are in a non-communication state with the first and third outlet ports respectively;

a second state in which all of the first to third opening portions are in the non-communication state with the first to third outlet ports respectively;

a third state in which only the first opening portion communicates with the first outlet port and the second and third opening portions are in the non-communication state with the second and third outlet ports respectively;

a fourth state in which the first and second opening portions communicate with the first and second outlet ports respectively and only the third opening portion is in the non-communication state with the third outlet port; and a fifth state in which all of the first to third opening portions communicate with the first to third outlet ports respectively.

18. The flow rate-controlling valve as claimed in claim 17, wherein:

the first to fifth states are continuously shifted according to rotation of the valve body.

19. The flow rate-controlling valve as claimed in claim 17, wherein:

after the first state is shifted to the second state, the second state is shifted to the third state, and after the third state is shifted to the fourth state, the fourth state is shifted to the fifth state.

20. A flow rate-controlling valve, comprising:

a housing having
an introduction port that introduces fluid into a substantially cylindrical valve body accommodating portion; and
first to third discharge ports that communicate with the valve body accommodating portion from a radial direction and discharge the fluid from the valve body accommodating portion;

a substantially cylindrical valve body rotatably supported in the housing, the valve body having first to third opening portions whose overlap states with the respective first to third discharge ports are changed according to a rotation position of the valve body; and an actuator controlling the rotation position of the valve body, and the first and second opening portions being arranged parallel in an axial direction on an outer peripheral surface of the valve body, and the third opening portion being arranged in a different circumferential direction position from the first or second opening portion on the outer peripheral surface of the valve body so that at least a part of the third opening portion overlaps with the first or second opening portion in the axial direction.

* * * * *